United States Patent
Vishnepolsky et al.

(10) Patent No.: US 10,642,600 B2
(45) Date of Patent: May 5, 2020

(54) CLOUD SUFFIX PROXY AND A METHOD THEREOF

(71) Applicant: Microsoft Technology Licensing, LLC., Redmond, WA (US)

(72) Inventors: Gregory Vishnepolsky, Rehovot (IL); Liran Moysi, Ramat Gan (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/400,478

(22) Filed: May 1, 2019

(65) Prior Publication Data

US 2019/0258473 A1    Aug. 22, 2019

Related U.S. Application Data

(63) Continuation of application No. 14/847,469, filed on Sep. 8, 2015, now Pat. No. 10,324,702, and a
(Continued)

(51) Int. Cl.
*G06F 9/44* (2018.01)
*G06F 8/65* (2018.01)
(Continued)

(52) U.S. Cl.
CPC .............. *G06F 8/65* (2013.01); *G06F 16/958* (2019.01); *G06F 17/2247* (2013.01);
(Continued)

(58) Field of Classification Search
None
See application file for complete search history.

(56) References Cited

U.S. PATENT DOCUMENTS 6,397,246 B1    5/2002  Wolfe
6,978,367 B1 *  12/2005 Hind .................. G06F 21/577
                                                    380/273
(Continued)

FOREIGN PATENT DOCUMENTS

JP    2006526843 A    11/2006
JP    2009289206 A    12/2009
(Continued)

OTHER PUBLICATIONS

"Third Office Action Issued in Chinese Patent Application No. 201480061802.1", dated Sep. 16, 2019, 6 Pages.
(Continued)

*Primary Examiner* — Insun Kang
(74) *Attorney, Agent, or Firm* — M&B IP Analysts, LLC

(57) ABSTRACT

A method and system for securing a cloud application are provided. The method includes receiving a webpage sent to a client device from at least one cloud application; injecting a piece of code into the webpage, wherein the piece of code maintains an encryption key in a document object model (DOM) of the webpage, wherein the piece of code allows encryption of any text field in the webpage when executed by the client device; intercepting at least one encrypted text field inserted into the DOM; and modifying the DOM by decrypting each of the intercepted at least one encrypted text field and inserting each decrypted text field into the DOM.

19 Claims, 4 Drawing Sheets

Related U.S. Application Data continuation-in-part of application No. 14/539,980, filed on Nov. 12, 2014, now Pat. No. 9,438,565.

(60) Provisional application No. 62/049,473, filed on Sep. 12, 2014.

(51) Int. Cl.
| | | |
|---|---|---|
| *G06F 21/53* | (2013.01) | |
| *G06F 17/22* | (2006.01) | |
| *G06F 16/958* | (2019.01) | |
| *H04L 29/08* | (2006.01) | |
| *H04L 29/12* | (2006.01) | |

(52) U.S. Cl.
CPC ............. *G06F 21/53* (2013.01); *H04L 67/02* (2013.01); *H04L 67/1002* (2013.01); *H04L 67/2814* (2013.01); *H04L 61/301* (2013.01); *H04L 61/3055* (2013.01)

(56) References Cited

U.S. PATENT DOCUMENTS

| | | |
|---|---|---|
| 7,571,217 B1 | 8/2009 | Saxena |
| 7,873,707 B1 | 1/2011 | Subramanian et al. |
| 7,958,232 B1 | 6/2011 | Colton et al. |
| 8,543,726 B1 | 9/2013 | Kann et al. |
| 8,856,869 B1 | 10/2014 | Brinskelle |
| 8,938,800 B2 | 1/2015 | Bhargava et al. |
| 9,137,131 B1 | 9/2015 | Sarukkai et al. |
| 9,154,479 B1 | 10/2015 | Sethi |
| 9,369,437 B2 | 6/2016 | Holloway et al. |
| 9,391,832 B1 | 7/2016 | Song et al. |
| 9,438,625 B1 | 9/2016 | Yang |
| 9,507,922 B1* | 11/2016 | Gouesbet ................ G06F 21/60 |
| 2006/0117388 A1 | 6/2006 | Nelson et al. |
| 2007/0016949 A1 | 1/2007 | Dunagan et al. |
| 2007/0180510 A1 | 8/2007 | Long et al. |
| 2008/0177691 A1 | 7/2008 | Alperovitch et al. |
| 2009/0077369 A1 | 3/2009 | Fujimaki |
| 2009/0083726 A1 | 3/2009 | Amend et al. |
| 2009/0217354 A1 | 8/2009 | Blum et al. |
| 2009/0262741 A1 | 10/2009 | Jungck et al. |
| 2009/0289206 A1 | 11/2009 | Ding et al. |
| 2010/0103837 A1 | 4/2010 | Jungck et al. |
| 2010/0146260 A1 | 6/2010 | Levow et al. |
| 2010/0162346 A1 | 6/2010 | Holostov et al. |
| 2010/0313183 A1 | 12/2010 | Ellen et al. |
| 2010/0325357 A1 | 12/2010 | Reddy et al. |
| 2011/0029613 A1 | 2/2011 | Hedditch |
| 2011/0131478 A1 | 6/2011 | Tock et al. |
| 2011/0208838 A1 | 8/2011 | Thomas et al. |
| 2011/0257810 A1 | 10/2011 | Leger |
| 2011/0283110 A1* | 11/2011 | Dapkus ................ G06F 21/577 713/182 |
| 2011/0289434 A1 | 11/2011 | Kieft |
| 2011/0289588 A1 | 11/2011 | Sahai et al. |
| 2012/0023160 A1 | 1/2012 | Marmor |
| 2012/0030294 A1* | 2/2012 | Piernot ............... H04L 61/2596 709/206 |
| 2012/0036576 A1 | 2/2012 | Iyer |
| 2012/0116896 A1* | 5/2012 | Holloway ............. H04L 63/102 705/14.73 |
| 2012/0137210 A1 | 5/2012 | Dillon |
| 2012/0174236 A1 | 7/2012 | Goodwin et al. |
| 2012/0278872 A1 | 11/2012 | Woelfel et al. |
| 2013/0073609 A1 | 3/2013 | Connolly et al. |
| 2013/0097706 A1 | 4/2013 | Titonis et al. |
| 2013/0097711 A1 | 4/2013 | Basavapatna et al. |
| 2013/0196396 A1 | 8/2013 | Beeson et al. |
| 2013/0212689 A1 | 8/2013 | Ben-Natan et al. |
| 2013/0254551 A1* | 9/2013 | Greene ................ G06F 17/00 713/189 |
| 2013/0276136 A1* | 10/2013 | Goodwin ................ H04L 67/22 726/27 |
| 2013/0311863 A1* | 11/2013 | Gutkin ................ G06F 16/9566 715/208 |
| 2013/0347094 A1 | 12/2013 | Bettini et al. |
| 2014/0020072 A1 | 1/2014 | Thomas |
| 2014/0032759 A1 | 1/2014 | Barton et al. |
| 2014/0109175 A1 | 4/2014 | Barton et al. |
| 2014/0137273 A1 | 5/2014 | Workman |
| 2014/0173415 A1* | 6/2014 | Kattil Cherian .......... G06F 9/54 715/234 |
| 2014/0201524 A1 | 7/2014 | Dittrich |
| 2014/0237545 A1 | 8/2014 | Mylavarapu et al. |
| 2014/0282464 A1 | 9/2014 | El-Gillani |
| 2014/0282518 A1 | 9/2014 | Banerjee |
| 2014/0283000 A1 | 9/2014 | Radhakrishnan |
| 2014/0344332 A1 | 11/2014 | Giebler |
| 2015/0066575 A1 | 3/2015 | Baikalov et al. |
| 2015/0088968 A1 | 3/2015 | Wei et al. |
| 2016/0119344 A1 | 4/2016 | Santos et al. |
| 2016/0330172 A1 | 11/2016 | Muttik |
| 2017/0116349 A1 | 4/2017 | Steiner et al. |
| 2017/0163675 A1 | 6/2017 | Warman et al. |

FOREIGN PATENT DOCUMENTS

| | | |
|---|---|---|
| JP | 2011511974 A | 4/2011 |
| JP | 2011257810 A | 12/2011 |
| JP | 2013196396 A | 9/2013 |
| WO | 2011094807 A1 | 8/2011 |
| WO | 2012063282 A1 | 5/2012 |
| WO | 2013091709 A1 | 6/2013 |

OTHER PUBLICATIONS

"Final Office Action Issued in U.S. Appl. No. 14/968,432", dated Mar. 23, 2017, 21 Pages.

"Final Office Action Issued in U.S. Appl. No. 14/539,980", dated Dec. 8, 2015, 13 Pages.

"International Search Report and Written Opinion Issued in PCT Application No. PCT/US2015/049606", dated Feb. 25, 2016, 07 Pages.

"Non Final Office Action Issued in U.S. Appl. No. 14/968,432", dated Feb. 5, 2018, 19 Pages.

"Non Final Office Action Issued in U.S. Appl. No. 14/968,432", dated Sep. 22, 2016, 17 Pages.

"Non-Final Office Action Issued in U.S. Appl. No. 14/539,980", dated Jan. 26, 2015, 9 Pages.

"Non-Final Office Action Issued in U.S. Appl. No. 14/968,432", dated Jul. 28, 2017, 18 Pages.

"Notice of Allowance Issued in U.S. Appl. No. 14/539,980", dated May 16, 2016, 4 Pages.

"Notice of Allowance Issued in U.S. Appl. No. 14/539,980", dated May 4, 2016, 12 Pages.

"Office Action Issued in Australia Patent Application No. 2014346390", dated Mar. 15, 2018, 3 Pages.

"Office Action Issued in Chile Patent Application No. 1116-2016", dated Jan. 26, 2018, 9 Pages.

"Office Action Issued in Chile Patent Application No. 1116-2016", dated Jul. 3, 2018, 12 Pages.

"Office Action Issued in Chinese Patent Application No. 201480061802.1", dated Aug. 3, 2018, 11 Pages.

"Office Action Issued in Colombian Patent Application No. 16-139041", dated Nov. 24, 2017, 17 Pages.

"Office Action Issued in Japanese Patent Application No. 2016-530954", dated Sep. 28, 2018, 4 Pages.

"Office Action Issued in Mexican Patent Application No. MX/a/2016/006109", dated Nov. 29, 2017, 2 pages(W/o English Translation).

"Office Action Issued in Russian Patent Application No. 2016117971", dated Jul. 9, 2018, 5 Pages.

"Second Office Action Issued in Chinese Patent Application No. 201480061802.1", dated Mar. 14, 2019, 7 Pages.

"Supplementary Examination Report Issued in Singapore Patent Application No. 11201603471X", dated Mar. 20, 2019, 3 Pages.

(56) References Cited

OTHER PUBLICATIONS

"Supplementary Search Report Issued in European Patent Application No. 14860194.1", dated May 31, 2017, 7 Pages.
Magazinius, et al., "Architectures for Inlining Security Monitors in Web Applications", In Proceedings of 6th International Symposium on Engineering Secure Software and Systems, Feb. 26, 2014, 18 Pages.
Patent Cooperation Treaty International Search Report and Written Opinion for PCT/US2014/065305, ISA/US, Alexandria, VA., dated Mar. 3, 2015.

* cited by examiner

CLOUD SUFFIX PROXY AND A METHOD THEREOF

CROSS-REFERENCE TO RELATED APPLICATIONS

This application is a continuation of U.S. patent application Ser. No. 14/847,469 filed Sep. 8, 2015, now allowed. The Ser. No. 14/847,469 application claims the benefit of U.S. Provisional Application No. 62/049,473 filed on Sep. 12, 2014. This application is also a continuation-in-part of U.S. patent application Ser. No. 14/539,980 filed on Nov. 12, 2014, the contents of which are hereby incorporated by reference.

TECHNICAL FIELD

This application relates generally to securing communications networks and systems by monitoring and securing communications, in particular by use of a suffix proxy.

BACKGROUND

In recent years more and more providers offer the ability to create computing environments in the cloud. For example, Amazon Web Services™ (also known as AWS) launched in 2006 a service that provides users with the ability to configure an entire environment tailored to an application executed over a cloud platform. In general, such services allow for developing scalable applications in which computing resources are utilized to support efficient execution of the application.

Organizations and businesses that develop, provide, or otherwise maintain cloud-based applications have become accustomed to rely on these services and implement various types of environments from complex websites to applications and services provided as a software-as-service (SaaS) delivery model. Such services and applications are collectively referred to as "cloud applications."

Cloud applications are typically accessed by users using a client device via a web browser. Cloud applications include, among others, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

Enterprises are increasingly adopting cloud-based SaaS offerings. These services are subject to varied network security risks. Known systems for securing these networks operate by inspecting traffic between servers operating the SaaS and the endpoint operated by a user. These known network security systems typically require complex configuration of the endpoint which increases system complexity.

Furthermore, in many cases, the endpoint may not be under the complete control of the enterprise, may be entirely unmanaged, or otherwise unconfigurable. In addition to the difficulties inherent in configuring and administering a user-controlled endpoint, it is difficult to ensure traffic captivation for an entire session when network addresses are generated dynamically.

In addition, modern web/cloud applications, such as the Google® Apps platform, utilize a large amount of client-side code (JavaScript). This can make a suffix proxy implementation much more challenging, as basic proxy functions are insufficient and further intervention in the client-side code is required.

It would therefore be advantageous to provide a solution that would overcome the deficiencies of the prior art techniques for capture and reconstruction of HTTP traffic.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Some embodiments of the disclosure relate to a method for securing a cloud application. The method comprises receiving a webpage sent to a client device from at least one cloud application; injecting a piece of code into the webpage, wherein the piece of code maintains an encryption key in a document object model (DOM) of the webpage, wherein the piece of code allows encryption of any text field in the webpage when executed by the client device; intercepting at least one encrypted text field inserted into the DOM; and modifying the DOM by decrypting each of the intercepted at least one encrypted text field and inserting each decrypted text field into the DOM.

Some embodiments of the disclosure relate to a system for a system for process for securing a cloud application. The system comprises a processor; and a memory containing instructions that, when executed by the processor, configure the system to: receive a webpage sent to a client device from the at least one cloud application; inject a piece of code to the webpage, wherein the piece of code maintains an encryption key in a document object model (DOM) of the webpage, wherein the piece of code when executed by the client device allows encryption of any text field in the webpage; intercept any encrypted text field inserted into the DOM; and modify the DOM by decrypting each intercepted encrypted text field and inserting each decrypted text field into the DOM

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
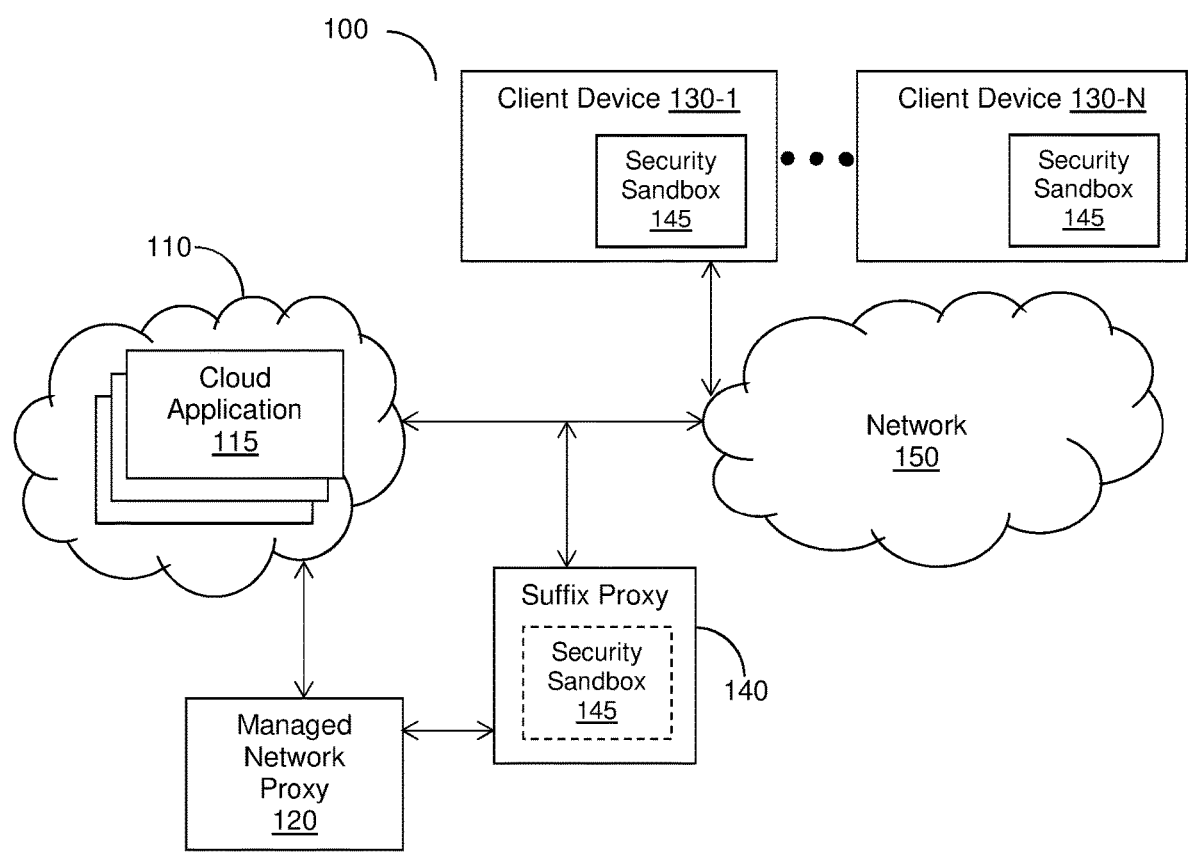
FIG. 1 is a diagram of a networked system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By a way of example, the various disclosed embodiments can be configured to operate on network traffic between a network-based software as a service (SaaS) provider and a client. As will be discussed in greater detail below, the disclosed embodiments allow for non-intrusive suffixing and un-suffixing of network addresses directed to the SaaS provider.

FIG. 1 is an exemplary and non-limiting diagram of a networked system 100 utilized to describe the various disclosed embodiments. The networked system 100 includes a cloud computing platform 110 which may be a private cloud, a public cloud, or a hybrid cloud providing computing resources to applications or services executed therein. In an embodiment, the cloud computing platform 110 may be of a SaaS platform.

Organizations and businesses that develop, provide, or otherwise maintain cloud-based applications have become accustomed to relying on these services and implementing various types of environments from complex websites to applications and services provided as SaaS delivery models. Such services and applications are collectively referred to as "cloud applications 115".

Cloud applications 115 are typically accessed by users using a client device via a web browser. Cloud applications 115 include, among others, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

The networked system 100 further includes a managed network proxy 120, client devices 130-1 through 130-N, and a suffix proxy 140 that are communicatively connected to a network 150. The network 150 may be, for example, a wide area network (WAN), a local area network (LAN), the Internet, and the like. Each of the client devices 130 may include, for example, a personal computer, a laptop, a tablet computer, a smartphone, a wearable computing device, or any other computing device.

The client devices 130 are configured to access the one or more cloud applications 115 executed in the cloud computing platform 110. A client device 130 may be a managed device or unmanaged device. A managed device is typically secured by an IT personnel of an organization, while an unmanaged device is not. Referring to the above example, the work computer is a managed device while the home computer is an unmanaged device.

The managed network proxy 120 is configured to secure any or all traffic and activities in a cloud computing platform 110. Specifically, the managed network proxy 120 can be used to intercept, monitor, modify, and forward network communications traffic between client devices 130 and the cloud computing platform 110.

The managed network proxy 120 can be configured to detect and mitigate network threats against the cloud applications 115 and/or the infrastructure of the cloud computing platform 110. As non-limiting examples, the managed network proxy 120 can be configured to notify of suspicious network traffic and behavior; block threats; perform application control, URL filtering, and malware protection on the network traffic; establish visibility to application layer parameters (e.g., list of users, devices, locations, etc.); generate profiles of users using the cloud applications 115; provide alerts on specific or predefined events; generate audit logs; and so on. The architecture and operation of the managed network proxy 120 is discussed in U.S. patent application Ser. No. 14/539,980 assigned to the common assignee, and incorporated herein by reference.

According to certain embodiments, the suffix proxy 140 is configured to keep URLs and web accesses of a proxied webpage within the hold of the managed network proxy 120. That is, the modifications performed by the suffix proxy 140 for a request to access a webpage of the cloud application 115 allow directing subsequent traffic to the managed network proxy 120.

In an embodiment, the suffix proxy 140 can be configured to inspect the network traffic and detect cloud-based application's 115 addresses. Examples for such addresses include, for example, uniform resource locators (URLs), uniform resource identifiers (URIs), and so on. As non-limiting examples, the suffix proxy 140 can decompile, deconstruct, or disassemble network traffic for inspection.

In an embodiment, the suffix proxy 140 can be configured to modify webpages and codes (e.g., JavaScript) executed therein and on the cloud-computing platform 110, so that no network addresses are provided to the client device 130 that would direct the client device 130 to access the cloud application 115 directly. If such a network address is detected, the suffix proxy 140 is configured to rewrite that address, for example, appending a predefined domain name to the original network address. The added domain name may refer or redirect the browser to the managed network proxy 120. For example, the URL (network address) http://www.somesite.com would be accessed through http://www.somesite.com.network-proxy-service.com. Various embodiments for rewriting network address are disclosed below.

The suffix proxy 140 can be configured to modify any content, including webpages, sent from the cloud application 115. The suffix proxy 140 can be configured to inspect and/or decompile any content to identify any referred pages and/or URLs present in the content and rewrite those URLs. As non-limiting examples, file types processed can include HTML or JavaScript and responses can include zipped responses or chunked responses.

In one embodiment, for static webpages, for URLs embedded in such webpages a predefined suffix domain name is added. To this end, the suffix proxy 140 is configured to parse HTML webpages and replace the URLs detected using the regular expressions. A static webpage is a webpage that does not contain client-executable script (e.g., JavaScript) code.

According to another embodiment, in order to suffix network addresses in a dynamic webpage, the suffix proxy 140 is configured to analyze and modify code or scripts being loaded to a browser of the client device 130. For example, JavaScript can be modified by the suffix proxy 140 to wrap any potential generation of network addresses that would directly access the cloud application 115. If direct access addresses are identified, the script and/or content generated by the script can be modified to rewrite the address to refer to the managed network proxy 120.

In an embodiment, the suffix proxy 140 is configured to provide a security sandbox which is a runtime component executed over the client device 130. Certain function of the security sandbox can be performed in the suffix proxy. The security sandbox is labeled as a security sandbox 145. In an embodiment, the security sandbox 145 is configured to prevent access to the document object model (DOM) of a webpage. In particular, the security sandbox 145 prevents any access and modification to the DOM during run-time of the script. It should be noted that the operation of the security sandbox 145 to prevent access to the DOM does not require any installation of any software, such as plugins, add-ons, and the like in the client device 130 and/or the browser.

Typically, a browser on a client device 130 can execute a script (e.g., JavaScript) that would change the DOM of a webpage during run-time. As a result, it is possible for the client device's 130 browser to create or modify DOM elements with un-suffixed URLs. In order to prevent such action, the security sandbox 145, and hence the suffix proxy 140, are configured to restrict the access of any embedded or loaded script code to the DOM.

In an embodiment, the nature of the restriction can be such that changes to URLs in the DOM, by an original script executed in the webpage, are monitored by the security sandbox 145. The script code monitoring by the suffix proxy 140 can be invoked for read and write accesses to DOM elements. That is, writes of a URL into the DOM are suffixed with the predefined domain name, and reads of a URL from the DOM are un-suffixed. As a result, there can be separation between the URLs seen by "user" code (e.g., the web-applications code) and the browser itself (the DOM, and the JavaScript representation of it). As a result, the original script code can be effectively maintained and controlled by the security sandbox 145 and any communication with the original server (around the proxy) is prevented. It should be noted that an original script is any script embedded in the webpage not dynamically loaded to the webpage.

In certain configurations, a script can be loaded to a webpage after the webpage is rendered on the browser. Such a script is downloaded from a server (originally configured to serve the page) using any of several forms, including inline scripts inside HTML pages and any code, script, or content files. Examples for such files include, for example, JavaScript, Cascading Style Sheets (CSS), and the like.

Typically, the browser of a client device 130 first loads the main HTML page, and then subsequently loads all referenced and inline scripts. Additional, scripts can also be loaded dynamically by the web application, using, for example, the 'eval' statement.

Because dynamic code loading is initially performed by the statically loaded code (or, once loaded, other dynamic code), the security sandbox 145 can take control of execution by modifying the static script code when the webpage is downloaded to the browser. The modifications to the code can be performed in such way that future dynamically loaded code will be modified during run-time and specific changes to the DOM can be intercepted in order to enforce suffixing of certain URLs. This allows the webpage to remain under the control of the suffix proxy 140.

In an embodiment, the suffix proxy 140 and the security sandbox 145 are configured to modify the dynamic loaded code. The loaded code is received at the suffix proxy 140 which is configured to analyze the code to determine all elements that potentially (explicitly or implicitly) contain, point, or otherwise refer to network addresses (URLs), and replace and/or wrap elements within code that enforces suffixing of the network addresses. The new script code is loaded at the client device's 130 browser. In some embodiments, caching of script codes can be employed to improve performance. The sandbox 145 during run-time resolves the wrappers in order to enforce suffix and un-suffix of network addresses. As noted above, enforcing suffix or network addresses includes suffixing writes of an address (e.g., a URL) into the DOM with a predefined domain name, and un-suffixing any reads of an address from the DOM.

As non-limiting examples, at least the following DOM elements and properties can be wrapped during the creation of the new script code:
Properties of HTML elements that contain URLs, such as "IFRAME", "STYLE", "LINK", "IMG", "AUDIO", "A", "FORM", "BASE" and "SCRIPT", with the properties: "src", "href" and "action". The getAttribute and setAttribute methods of these elements can also be used to set the aforementioned properties.

Properties of HTML elements that can contain a DOM sub-tree (i.e., more HTML). For such elements, the "appendChild" method can be used to add elements (and code) dynamically and the "innerHTML" property can be used to add extra code.

Properties of the "document" object may contain URLs or Hostnames, such as "cookie" and "domain" (both can contain the origin domain of the window). The "write" method can be used to add elements and code to the page.

An "open" method of XMLHttpRequest objects contains a request URL. An "origin" property of "MessageEvent" objects contains the origin hostname. Methods and properties of the "Window" object contain "location", "postMessage", "eval", and "execScripf". The "location" redirects the frame to another URL or determines the current location of the frame. The "postMessage" method has an origin argument. The "eval" and "execScripf" properties are used to load code dynamically. Other such elements and properties exist, and any or all of them can be wrapped.

In an embodiment, the wrapping of a DOM element, and thus the creation of a new code, is performed using static hooking of the code. In a non-limiting implantation, the static hooking includes: processing and extracting inline scripts in the HTML code of a webpage. Then, any script code is converted to a syntax tree, such as an Abstract Syntax Tree (AST). In an exemplary embodiment, the AST can be generated using the Mozilla® parser. The syntax tree is recursively traversed and calls to wrappers are inserted in certain nodes of the tree to allow for hooking. Finally, the new code is created from the modified nodes (with the inserted class) and sent to the client device's 130 browser. In an embodiment, the new created code can be cached for further usage.

It should be noted that the inserted wrappers can allow for DOM changes to be intercepted during run-time. The wrappers can be applied to cover any or all potential DOM accesses. As non-limiting examples, the wrappers can be applied (inserted) to some or all the following syntax tree (AST) nodes: 'MemberExpression', 'Identifier', 'AssignmentExpression', and 'CallExpression'. For MemberExpression nodes any potential accesses to object properties of DOM objects, subscription operations with non-literal keys, and access to specific properties (for example, obj.src) having a property name matches a white-list of "interesting" properties, are wrapped. In an embodiment, wrappers are inserted to wrap any appropriate object. Thus, some wrappers may not be required. The security sandbox 145 determines if a wrapper should be handled. In most cases, for example, "false positives", the wrapper will decide to do nothing.

For "Identifier" nodes, any potential accesses to a white-list of global Identifiers (which are properties of the window DOM object, e.g., "location") are wrapped. It should be noted that Identifier AST nodes can appear in many unrelated logical positions in the tree. Instances where the Identifier represents access to a global variable are wrapped. This is determined during the traversal step by checking the parent nodes and eliminating all other cases.

For AssignmentExpression node, the "=" and "+=" assignment operators are wrapped, as relevant DOM properties may be strings (URLs). Assignments to previously "marked" MemberExpressions and Identifiers are handled by another wrapper that specifically handles "set" access.

For CallExpression node, CallExpressions where a previously "marked" MemberExpression or Identifier is the callee are handled by another wrapper that specifically handles function calls. A special case exists with the call to "eval", which behaves like a statement, but is represented as a function call in the AST.

According to various embodiments, different wrapper functions can be defined according to the traversal of the The wrapper can be processed using suffixing or un-suffixing of a URL or hostname. Finally, a false positive wrapper invocation and resume normal execution can also be detected.

In another embodiment, wrapper function handlers that are responsible for handling DOM access to URL related properties or methods can be divided into logical groups. These groups include, for example, 'getters', 'setters', and 'detectors'. The 'getters' handle "get" wrappers. These will un-suffix handled URLs. If a method (JavaScript type "function") is accessed, a "decorator" is returned (see below). The 'setters' handle 'set' wrappers by suffixing assigned URLs. The 'decorators' are handle 'call wrappers that return matching decorator functions for the wrapped methods, which will suffix or un-suffix URLs according to what the decorated method is.

This decorator can be bound to the correct object using the JavaScript "bind" method. In case of "Identifier" wrappers, the correct object is the global object (in some cases, a window). In case of "MemberExpression" wrappers, this is the object being subscripted.

Following is a non-limiting example for code before and after wrapping:

```
Before
var new_src = location + '/image';
some_img.src = new_src;
var w = window.open('test');
eval('test( )');
var loc = x.src;
postMessage('some_message', 'origin');
After
var new_src = ___WRAPPED_name_get('location', location) + '/image';
___WRAPPED_set(some_img, 'src', '=', new_src);
var w = ___WRAPPED_call(window, 'open')('test');
eval(___WRAPPED_eval_param(eval, 'test( )'));
var loc = ___WRAPPED_get(x, 'src');
___WRAPPED_name_call('postMessage',
postMessage)('some_message', 'origin');
``` syntax tree. The different wrapper functions behave differently during run-time. The wrapper functions include wrapped_get, wrapped_set, and wrapped_call which are used to wrap access to MemberExpressions. The functions wrapped_name_get, wrapped_name_set, and wrapped_name_call are used to access global Identifiers. The function wrapped_eval_param specifically handles the code passed as the parameter of an "eval" call (which can affect the local scope, and thus cannot be decorated).

In some embodiments, the security sandbox 145 is configured to first detect if the wrapper was invoked on relevant objects or properties. Specifically, for "MemberExpression" wrappers, the property name is checked against a white-list, as well as the subscripted object. For "Identifier" wrappers, a white-list is consulted as well. Objects are determined to be of a certain type ("Document", "Window", HTML elements, and so on), and are also compared to global instances when applicable. These comparisons and lookups can be performed efficiently without significant impact on performance in many cases.

In an embodiment, a wrapper call can be processed using any one of various procedures, including, as non-limiting examples: process dynamically loaded code, where the new code (JavaScript code) is sent to a special REST API endpoint of the proxy for translation and caching, as described below. This can occur in wrappers of "appendChild", "innerHTML", "eval", "execScript", and "write".

In order to optimize and accelerate the creation of new code and serving of such code to minimize any delay on the client device 130, a caching mechanism is provided according to the disclosed embodiments. The caching mechanism is implemented at the suffix proxy 140 and configured to improve the overhead of the translation phase. In an embodiment, all elements of translated code (e.g., inline script, file, or dynamic translation request) are cached per server. The entries are keyed by a cryptographic hash of the original code. The cache is shared across users of the proxy. This way, only the first user per-server will experience the impact of the translation phase for commonly loaded scripts. In an embodiment, the dynamic script translation REST endpoint can also be configured to accept a client-side calculated hash and perform a lookup in the cache using it. This can reduce usage of upload bandwidth for the users of the proxy. In this fashion, dynamically generated scripts will almost never be actually sent to the proxy (except for the first time).

The disclosed caching mechanism further caches responses for dynamic translation requests (per hash) returned with "Cache-Control" and "Expires" HTTP headers such that the result will be cached by the client device's 130 browser. In this manner, the same client device 130 will not frequently query the suffix proxy 140 for the same dynamically generated scripts.

According to some embodiments, further optimization of the run-time performance is achieved by creating an optimized fast-path for irrelevant/false-positive wrapper invocations (at the code level). This is achieved by writing the basic wrapper functions with a limited subset of JavaScript to allow optimization by the client device 130 browser (e.g., using a JIT compiler of a browser). In another embodiment, a manual maintenance interface that allows for profiling and detection of the code paths having the most cache hits is provided. This enables removing certain wrappers from the translated code in the suffix proxy 140 cache.

According to various embodiments, the suffix proxy 140 using the security sandbox 145 is configured to implement additional security measures to protect the cloud application 115 and client devices 130. According to one embodiment, the security measures include configuring the security sandbox 145 to block a third-party content from being added to the DOM and thereby rendered on the client device 130. The third-party content may include, toolbars, advertisements, malware, and so on. According to this embodiment, any script code downloaded by to a client device 130 is intercepted by the sandbox 145 at the suffix proxy 140. Then, the code is analyzed and third-party content called by the script code (and subsequently added to the DOM) is removed.

In an embodiment, the suffix proxy 140 using the security sandbox 145 is configured to prevent access to URLs designated in a predefined blacklist, thereby blocking third-party content. The analysis of the code or any attempt to access third party content is performed in run-time as the code is loaded to the client device 130. The embodiments for analyzing the code and generating a new code respective are discussed in detail above.

In another embodiment, the suffix proxy 140 using the security sandbox 145 is configured to provide a DOM firewall that prevents websites from accessing certain features of the DOM and/or to perform certain operations on the client device 130. The actions/features that are restricted may include, for example, preventing a website from loading plugins or modifying the setting of the browser, blocking all cross-domain accesses between the client device 130 and other domains, and blocking all asynchronous requests between the webpage and the web server. In an embodiment, an alert is generated to the user of the operations that should be taken or are about to be taken. The user may be able to allow or deny any blocking operation.

It should be noted that the analysis of the code or any attempt to access third party content is performed in run-time as the code is loaded to the client device 130. The embodiments for analyzing the code and generating a new code respective thereto are discussed in detail above.

In yet another embodiment, the security sandbox 145 is configured to encrypt fields included in a webpage rendered on the web browser. These fields may include, for example, text fields, combo boxes, and the like. According this embodiment, an encryption key is generated by the security sandbox 145. The key is known only to the client device 130 and the security sandbox 145, but not to the cloud application 115. The encryption key is provided to the client device 130 through the new code injected to the webpage. As noted above, such code is sent to the browser from the security sandbox 145 upon analysis of a static webpage and/or when an inline script is sent to the security sandbox 145.

Using the encryption key, any fields shown on the webpage can be encrypted. The encryption of the data (contents of the field) is performed at the client device 130 while the decryption is performed by the security sandbox 145. In addition, any encrypted data is intercepted by the security sandbox 145. Then, all text insertions into the DOM are detected and text insertions of encrypted data are replaced with decrypted data (prior to insertion to the actual DOM). As a result of this operation, the original code (provided by the cloud-application 115) executed by the browser can access only encrypted data. If the code tries to read the decrypted data out of the DOM, the security sandbox 145 intercepts this attempt and encrypts the data back again.

It should be noted that because the original code is sandboxed, execution of the code cannot access injected objects and/or wrapper function and read out the encryption key. As a result, even if the cloud computing platform 110 is hacked, hackers can access only see encrypted data. If hackers inject code into the live site in order to steal the data from the client device 130, the injected code is processed by the sandbox 145, and thus cannot access any data residing in the client device 130.

It should be understood that the embodiments disclosed herein are not limited to the specific architectures illustrated in FIG. 1 and other architectures may be equally used without departing from the scope of the disclosed embodiments. Specifically, the suffix proxy 140 may reside in the cloud computing platform 110, a different cloud computing platform, or a connectable datacenter. Moreover, in an embodiment, there may be a plurality of suffix proxies 140 operating as described hereinabove and configured to either have one as a standby appliance to take control in a case of failure, or to share the load between them, or to split the functions between them. Furthermore, without departing from the scope of the disclosed embodiments, various functions of the suffix proxy 140 may be implemented by the managed network proxy 120.

Figure 2:
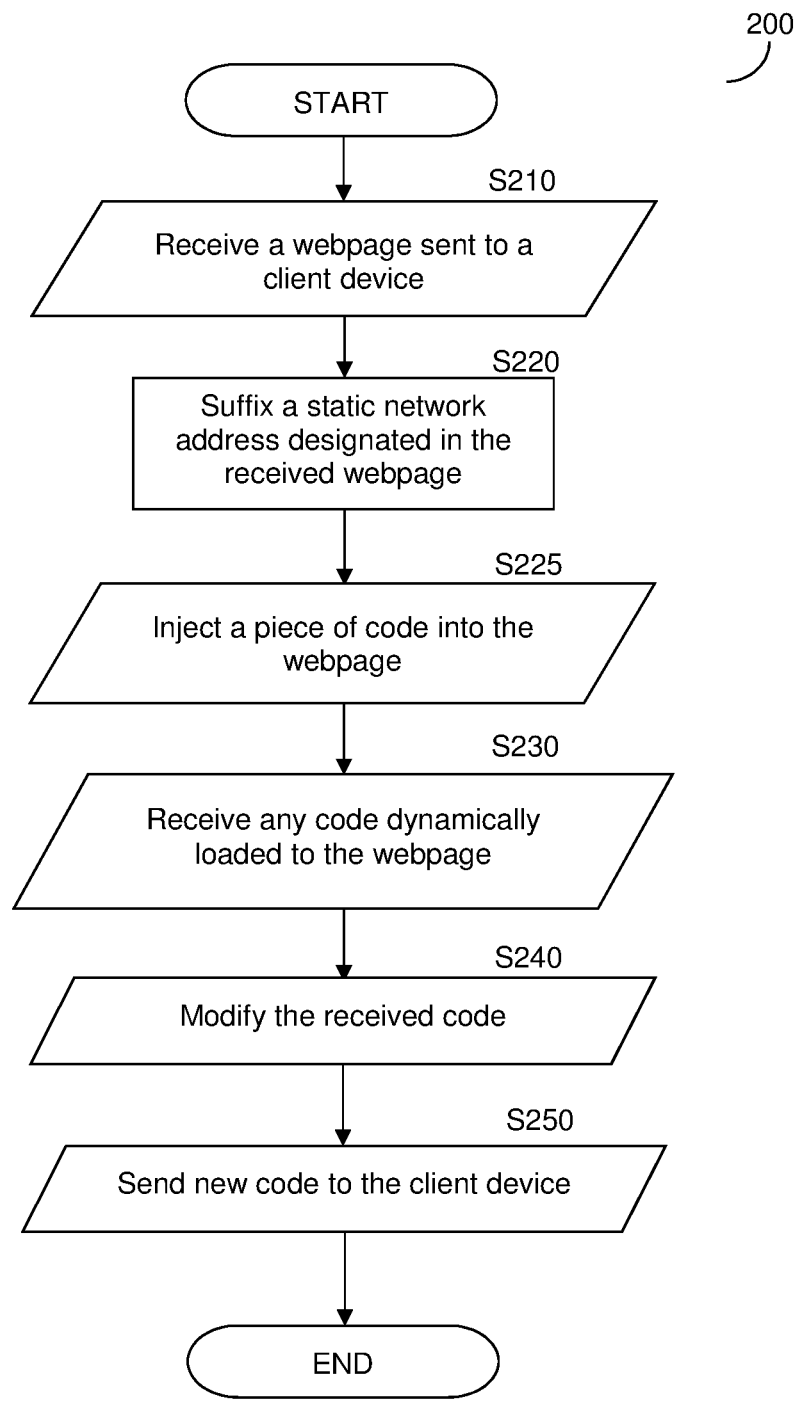
FIG. 2 is a flowchart illustrating the operation of the security sandbox according to one embodiment.

FIG. 2 shows an exemplary and non-limiting flowchart 200 illustrating a method for suffixing network addresses according to one embodiment.

At S210, a webpage sent to a client device from a cloud-application is received. The webpage may be sent from an access proxy or any device in the line of traffic between the client device and the cloud application. In an embodiment, the webpage is intercepted by a suffix proxy.

At S220, a static network address designated in the received webpage is suffixed. That is, a predefined domain name suffix is added to the network address. The network address or addresses to be suffixed are determined based on a predefined list of URLs.

At S225, a piece of code (JavaScript code) is injected into the webpage to later process scripts, code, or content files that are dynamically loaded to the webpage. Examples for such files include, for example, JavaScript, CSS, and the like. The modified webpage is relayed to the client device's browser.

The rendering of the webpage on the client's browser may cause dynamic loading of content from a server (e.g., server running the cloud-application) to the webpage. According to various embodiments, any attempt to load such code (for example, through a static inline script) is detected in order to allow, e.g., the security sandbox 145 to control the execution of the dynamic code, such as static script code, when the webpage is downloaded to the browser.

At S230, any code that is dynamically loaded to the webpage is received. For example, such code can be sent from the browser to the suffix proxy 140. In an embodiment, the received code is cached for future usage. At S240, the received code is modified. In an embodiment, S240 is performed by the suffix proxy. Specifically, the code modification is performed in such way that future dynamically loaded code will be modified during run-time and specific changes to the DOM can be intercepted in order to enforce suffixing of certain network address.

In some embodiments, the enforcing suffixing of network addresses includes suffixing writes of an address (URL) into the DOM with a predefined domain name and un-suffixing any reads of an address (URL) from the DOM.

As discussed in detail above, the code modification includes wrapping certain DOM elements. In a further embodiment, the modification of the code is performed using static hooking techniques discussed in detail above. Step S240 will result in a new code (an example for such new code is provided above). In an embodiment, the new code is cached for future usage. The various embodiments of the caching mechanism are described above.

At S250, the new code is sent to the client device for execution thereon. It should be noted that S230 and S240 are performed for any dynamic code, script, or file included in the webpage. It should be emphasized that steps S230 and S240 are performed completely during run-time.

Figure 3:
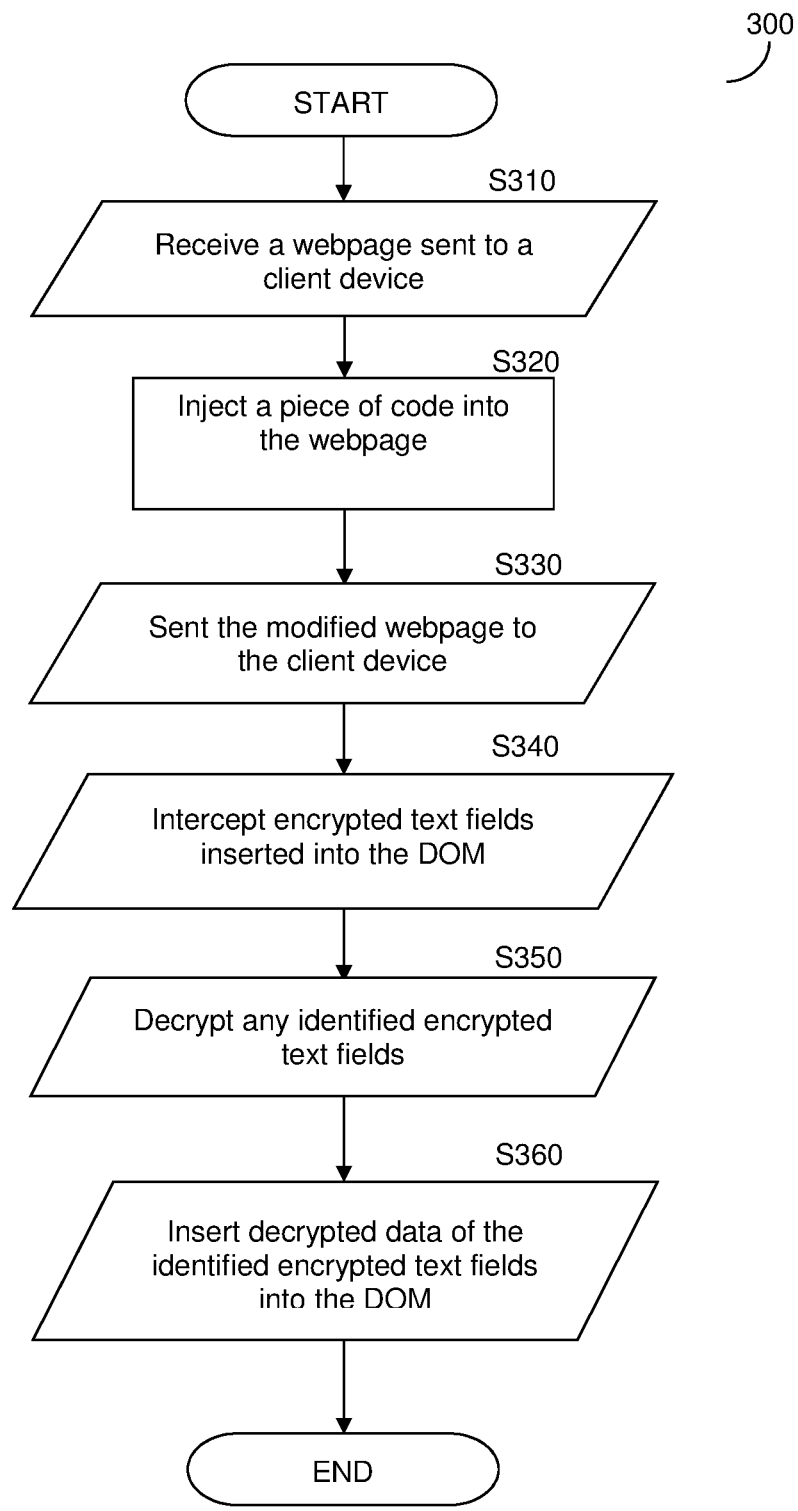
FIG. 3 is a flowchart illustrating a method for controlling changes to the DOM according to one embodiment.

FIG. 3 shows an exemplary and non-limiting flowchart 300 illustrating a method for controlling changes to the DOM according to one embodiment.

At S310, a webpage sent to a client device from a cloud-application is received. The webpage may be sent from an access proxy or any device in the line of traffic between the client device and the cloud application. In an embodiment, the webpage is intercepted by the suffix proxy.

At S320, a piece of code (e.g., JavaScript code) is injected into the webpage to later process scripts, code, or content files that are dynamically loaded to the webpage. In an embodiment, the piece of code maintains an encryption key in the DOM of the webpage. The encryption key is known to the suffix proxy, but not to the cloud-application and/or a provider of the cloud platform.

At S330, the modified webpage is sent to the client device. The injected piece of code together with the encryption key allow the user of the client device to encrypt any text field in the webpage.

At S340, encrypted text fields inserted into the DOM are intercepted. The recognition of the encrypted text is performed, for example, by searching for a known encryption pattern. At S350, any identified encrypted text field is decrypted. Then, at S360, the decrypted data of the identified encrypted text fields is inserted into the DOM. It should be noted that any code (e.g., JavaScript code) provided by the cloud application cannot read decrypted data from the DOM. It should be further noted that any attempt to read such data outside of the DOM is intercepted, for example, by the security sandbox 145. Therefore, the disclosed method for controlling changes to the DOM provides another layer of security to the cloud-application.

Figure 4:
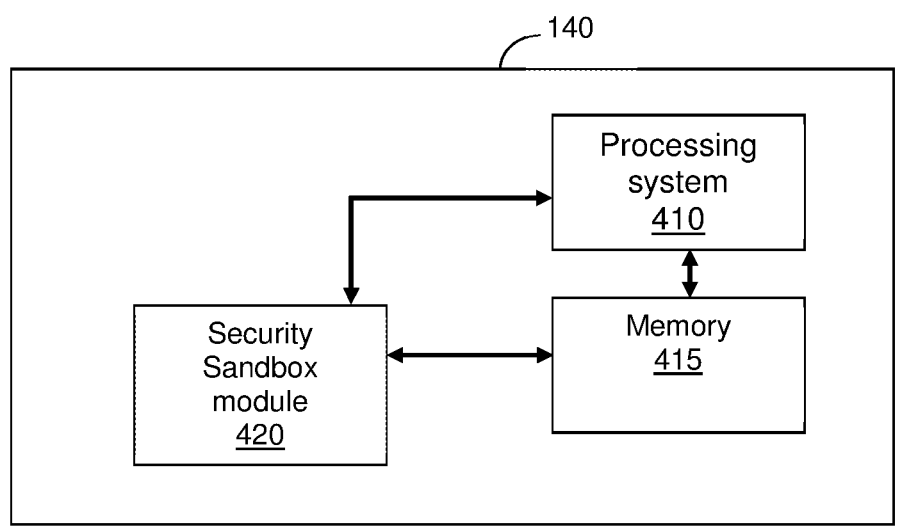
FIG. 4 is a block diagram of a suffix proxy implemented according to an embodiment.

FIG. 4 shows an exemplary and non-limiting block diagram of the suffix proxy 140 constructed according to one embodiment. The suffix proxy 140 may be deployed in cloud-computing platforms, data centers, or as a stand-alone network device. The suffix proxy 140 is configured to at least control and enforce access to cloud applications based on access policies described in greater detail above.

The suffix proxy 140 includes a processing system 410 coupled to a memory 415, and a security sandbox module 420. The processing system 410 uses instructions stored in the memory 415 to control the operation of the suffix proxy 140.

The processing system 410 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 410 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 410 to perform the various functions described herein.

The security sandbox module 420 is configured to monitor any changes to the DOM, prevent access to the DOM, and suffix and un-suffix network addresses. As discussed in detail above, the operation of the security sandbox module 420 is performed in run-time, i.e., when the webpage is rendered on the web browser of a client device 130.

The webpage is provided by the cloud-application 115. The operation of the security sandbox module 420 is discussed in detail above. In an embodiment, the security sandbox module 420 can be realized as a processing unit having the various structural configurations discussed in detail above.

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing a cloud application, comprising:
   receiving a webpage sent to a client device from at least one cloud application;
   injecting a piece of code into the webpage, wherein the piece of code maintains an encryption key in a document object model (DOM) of the webpage, wherein the piece of code allows encryption of any text field in the webpage when executed by the client device;
   intercepting at least one encrypted text field inserted into the DOM; and
   modifying the DOM by decrypting each of the intercepted at least one encrypted text field and inserting each decrypted text field into the DOM.

2. The method of claim 1, further comprising:
   monitoring access to the DOM; and
   preventing at least one operation that can modify the DOM.

3. The method of claim 2, wherein the at least one operation is at least one of: loading plugins to the client device, a cross domain access, and an asynchronous request between the webpage and a web server.

4. The method of claim 1, wherein the webpage designates at least one script loaded to the client device during runtime of the at least one script.

5. The method of claim 4, further comprising:
   executing, in a sandbox, the at least one script; and
   monitoring execution of the at least one script to detect any attempts to change the DOM of the webpage at runtime.

6. The method of claim 5, further comprising:
   suffixing, at runtime, at least one write of a network address to the DOM; and
   un-suffixing, at runtime, at least one read of the network address from the DOM.

7. The method of claim 6, wherein the network address is at least a uniform resource locator (URL), wherein the script is at least one of: a JavaScript code and a Cascading Style Sheets (CSS) file.

8. The method of claim 1, wherein the method is performed without modifying a default client device configuration.

9. The method of claim 1, wherein the method is performed by a suffix proxy device connected between the client device and a cloud platform hosting the at least one cloud application.

10. A non-transitory computer readable medium having stored thereon instructions for causing at least one processor to execute a process for securing a cloud application, the process comprising:
    receiving a webpage sent to a client device from the at least one cloud application;
    injecting a piece of code to the webpage, wherein the piece of code maintains an encryption key in a document object model (DOM) of the webpage, wherein the piece of code when executed by the client device allows encryption of any text field in the webpage;
    intercepting any encrypted text field inserted into the DOM; and
    modifying the DOM by decrypting each intercepted encrypted text field and inserting each decrypted text field into the DOM.

11. A system for process for securing a cloud application, comprising:
    a processor; and
    a memory containing instructions that, when executed by the processor, configure the system to:
    receive a webpage sent to a client device from the at least one cloud application;
    inject a piece of code to the webpage, wherein the piece of code maintains an encryption key in a document object model (DOM) of the webpage, wherein the piece of code when executed by the client device allows encryption of any text field in the webpage;
    intercept any encrypted text field inserted into the DOM; and
    modify the DOM by decrypting each intercepted encrypted text field and inserting each decrypted text field into the DOM.

12. The system of claim 11, wherein the system is further configured to:
    monitor access to the DOM; and
    prevent at least one operation that can modify the DOM.

13. The system of claim 12, wherein the at least one operation is any one of: loading plugins to the client device, a cross domain access, and an asynchronous request between the webpage and the web server.

14. The system of claim 11, wherein the webpage designates at least one script loaded to the client device during runtime.

15. The system of claim 14, wherein the system is further configured to:
    cause execution of the at least one script to monitor any attempts to change the DOM of the webpage at runtime.

16. The system of claim 15, wherein the system is further configured to:
    suffix, at runtime, any write of a network address to the DOM; and
    un-suffix, at runtime, any read of a network address from the DOM.

17. The system of claim 16, wherein the network address is at least a uniform resource locator (URL), and wherein the at least script is any one of: a JavaScript code and a Cascading Style Sheets (CSS) file.

18. The system of claim 11, wherein the method is performed without requiring any modification of a default client device configuration.

19. The system of claim 11, wherein the system is connected between the client device and a cloud platform hosting the cloud application.

* * * * *